United States Patent
Okuno et al.

(10) Patent No.: US 12,222,032 B2
(45) Date of Patent: Feb. 11, 2025

(54) CONTROL DEVICE FOR VEHICLE, CONTROL METHOD FOR VEHICLE, AND NON-TRANSITORY COMPUTER-READABLE MEDIUM

(71) Applicants: JATCO Ltd, Fuji (JP); NISSAN MOTOR CO., LTD., Yokohama (JP)

(72) Inventors: Koichi Okuno, Kawasaki (JP); Keisuke Iwado, Ebina (JP); Makoto Oguri, Ayase (JP); Akira Tsuchida, Sagamihara (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 18/575,174

(22) PCT Filed: Jun. 20, 2022

(86) PCT No.: PCT/JP2022/024502
§ 371 (c)(1),
(2) Date: Dec. 28, 2023

(87) PCT Pub. No.: WO2023/276752
PCT Pub. Date: Jan. 5, 2023

(65) Prior Publication Data
US 2024/0426376 A1  Dec. 26, 2024

(30) Foreign Application Priority Data
Jul. 2, 2021  (JP) ................ 2021-110773

(51) Int. Cl.
*F16H 61/00* (2006.01)
*F16H 59/42* (2006.01)
*F16H 59/72* (2006.01)

(52) U.S. Cl.
CPC ........ *F16H 61/0031* (2013.01); *F16H 59/42* (2013.01); *F16H 59/72* (2013.01)

(58) Field of Classification Search
CPC ....... F16H 59/42; F16H 59/72; F16H 61/0031
See application file for complete search history.

(56) References Cited

U.S. PATENT DOCUMENTS

2005/0217618 A1* 10/2005 Watanabe ............ F02B 75/047
123/197.1
2011/0082630 A1* 4/2011 Kawaguchi ......... F16H 61/0031
477/34

(Continued)

FOREIGN PATENT DOCUMENTS

JP   H07-174216 A   7/1995
JP   2010-007834 A   1/2010

(Continued)

*Primary Examiner* — Edwin A Young
(74) *Attorney, Agent, or Firm* — Foley & Lardner LLP

(57) ABSTRACT

A control device for a vehicle, the vehicle including a belt continuously variable transmission including a mechanical oil pump driven by an engine and an electric oil pump driven by an electric motor, the engine being configured to drive a drive wheel, in which when a rotation speed of the engine is less than or equal to a prescribed rotation speed as the vehicle decelerates, driving of the electric motor is controlled to supply a hydraulic pressure from the electric oil pump to the belt continuously variable transmission, and when the deceleration of the vehicle exceeds a prescribed deceleration, the driving of the electric motor is restricted not to supply the hydraulic pressure from the electric oil pump to the belt continuously variable transmission.

6 Claims, 4 Drawing Sheets

(56) References Cited

U.S. PATENT DOCUMENTS

2012/0302400 A1    11/2012  Wakayama et al.
2014/0207348 A1*    7/2014  Wakayama ..... B60W 30/18072
                                                701/54

FOREIGN PATENT DOCUMENTS

| JP | 2011-185380 A | 9/2011 |
| JP | 2012-154392 A | 8/2012 |
| JP | 2017-044069 A | 3/2017 |
| JP | 2018-145805 A | 9/2018 |

* cited by examiner

CONTROL DEVICE FOR VEHICLE, CONTROL METHOD FOR VEHICLE, AND NON-TRANSITORY COMPUTER-READABLE MEDIUM

TECHNICAL FIELD

The present invention relates to a control device for a vehicle, a control method for a vehicle, and a program.

BACKGROUND ART

Patent Document 1 discloses that a pump driving control means controls driving of an electric oil pump to start driving of the electric oil pump at a high vehicle speed detected by a vehicle speed detection means as a deceleration request detected by a deceleration request detection means increases.

PRIOR ART DOCUMENT

Patent Document

Patent Document 1: JP 2012-154392 A

SUMMARY OF INVENTION

However, in the invention described in Patent Document 1, when a deceleration of a vehicle is large, the electric oil pump suctions in air, and therefore, when a driver requests a start after the vehicle is stopped or when the driver requests acceleration while the vehicle is decelerating, the timing at which the vehicle accelerates is delayed, and the driver may feel uncomfortable.

The present invention has been made in view of such problems, and an object thereof is to provide a control device for a vehicle, a control method for a vehicle, and a program capable of reducing the influence on a transmission due to air suction by an electric oil pump.

According to an aspect of the present invention, a control device for a vehicle, the vehicle including a transmission including a first oil pump driven by a first drive source and a second oil pump driven by a second drive source, the first drive source being configured to drive a drive wheel, wherein
  when a rotation speed of the first drive source is less than or equal to a prescribed rotation speed as the vehicle decelerates, driving of the second drive source is controlled to supply a hydraulic pressure from the second oil pump to the transmission, and
  when a deceleration of the vehicle exceeds a prescribed deceleration, the driving of the second drive source is restricted not to supply the hydraulic pressure from the second oil pump to the transmission, is provided.

According to another aspect of the present invention, a control method for a vehicle, the vehicle including a transmission including a first oil pump driven by a first drive source and a second oil pump driven by a second drive source, the first drive source being configured to drive a drive wheel, the control method comprising:
  controlling driving of the second drive source to supply a hydraulic pressure from the second oil pump to the transmission when a rotation speed of the first drive source is less than or equal to a prescribed rotation speed as the vehicle decelerates; and
  restricting the driving of the second drive source not to supply the hydraulic pressure from the second oil pump to the transmission when a deceleration of the vehicle exceeds a prescribed deceleration, is provided.

According to yet another aspect of the present invention, a program executable by a computer for controlling a vehicle, the vehicle including a transmission including a first oil pump driven by a first drive source and a second oil pump driven by a second drive source, the first drive source being configured to drive a drive wheel, the program causing the computer to execute:
  a procedure of controlling driving of the second drive source to supply a hydraulic pressure from the second oil pump to the transmission when a rotation speed of the first drive source is less than or equal to a prescribed rotation speed as the vehicle decelerates; and
  a procedure of restricting the driving of the second drive source not to supply the hydraulic pressure from the second oil pump to the transmission when a deceleration of the vehicle exceeds a prescribed deceleration, is provided.

According to this aspect, it is possible to reduce the influence on the transmission due to air suction by the electric oil pump.

DESCRIPTION OF EMBODIMENTS

Figure 1:
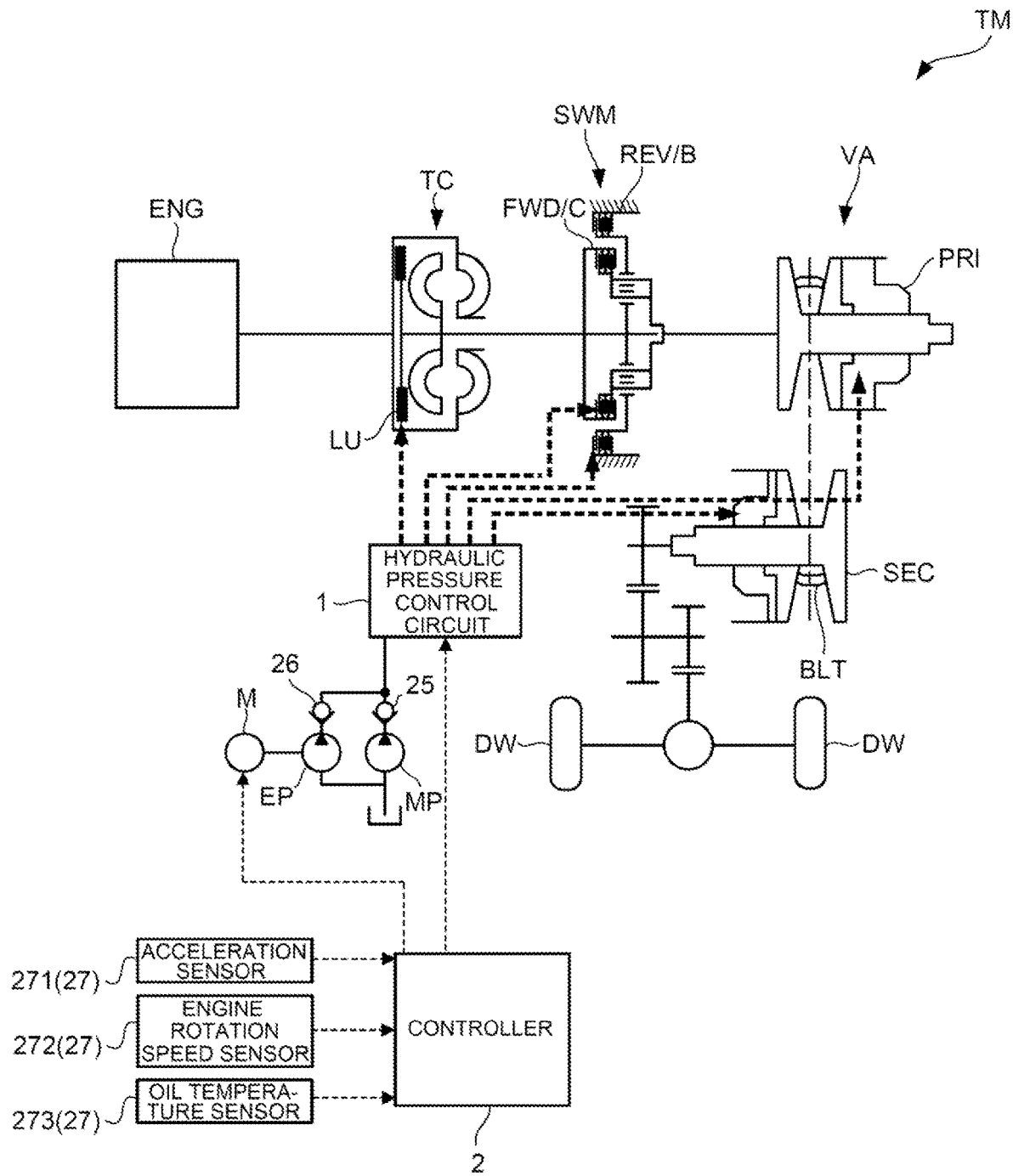
FIG. 1 is a schematic configuration diagram of a vehicle.

Hereinafter, an embodiment of the present invention (hereinafter, referred to as the present embodiment) will be described with reference to the accompanying drawings.
(Configuration of Transmission)
First, a transmission TM according to the present embodiment will be described with reference to FIG. 1.
FIG. 1 is a schematic configuration diagram of a vehicle.
As shown in FIG. 1, the vehicle includes an engine ENG as a first drive source, a torque converter TC, a forward and reverse switching mechanism SWM, and a variator VA. In the vehicle, the transmission TM is a belt continuously variable transmission including the torque converter TC, the forward and reverse switching mechanism SWM, and the variator VA.
The engine ENG constitutes a drive source of the vehicle. The power of the engine ENG is transmitted to drive wheels DW via the torque converter TC, the forward and reverse switching mechanism SWM, and the variator VA. In other words, the torque converter TC, the forward and reverse switching mechanism SWM, and the variator VA are provided in a power transmission path connecting the engine ENG and the drive wheels DW.
The torque converter TC transmits power via a fluid. In the torque converter TC, the power transmission efficiency is enhanced by engaging a lock-up clutch LU.
The forward and reverse switching mechanism SWM is provided in a power transmission path connecting the engine ENG and the variator VA. The forward and reverse switching mechanism SWM switches the forward and reverse of the vehicle by switching a rotation direction of the input rotation. The forward and reverse switching mechanism SWM includes a forward clutch FWD/C that is engaged when a forward range is selected and a reverse brake REV/B that is engaged when a reverse range is selected. When the forward clutch FWD/C and the reverse brake REV/B are disengaged, the transmission TM is in a neutral state, that is, a power cutoff state.

The variator VA constitutes a belt continuously variable transmission mechanism including a primary pulley PRI, a secondary pulley SEC, and a belt BLT wound around the primary pulley PRI and the secondary pulley SEC. A primary pulley pressure Ppri, which is a hydraulic pressure of the primary pulley PRI, is supplied to the primary pulley PRI from a hydraulic pressure control circuit 1 to be described later, and a secondary pulley pressure Psec, which is a hydraulic pressure of the secondary pulley SEC, is supplied to the secondary pulley SEC from the hydraulic pressure control circuit 1.

The transmission TM further includes a mechanical oil pump MP as a first oil pump, an electric oil pump EP as a second oil pump, and an electric motor M as a second drive source.

The mechanical oil pump MP pumps (supplies) oil to the hydraulic pressure control circuit 1. A check valve 25 is provided in a flow path that allows the mechanical oil pump MP to communicate with the hydraulic pressure control circuit 1. The mechanical oil pump MP is driven by the power of the engine ENG.

The electric oil pump EP pumps (supplies) oil to the hydraulic pressure control circuit 1 together with or independently of the mechanical oil pump MP. A check valve 26 is provided in a flow path that allows the electric oil pump EP to communicate with the hydraulic pressure control circuit 1. The electric oil pump EP is auxiliary to the mechanical oil pump MP. That is, when the supply of oil from the mechanical oil pump MP to the transmission TM is stopped or insufficient, the electric oil pump EP temporarily supplies oil to the transmission TM based on a drive request to compensate for oil shortfall. The electric motor M drives the electric oil pump EP. It may be understood that the electric oil pump EP includes the electric motor M.

The transmission TM further includes the hydraulic pressure control circuit 1 and a controller 2 serving as a control device for a vehicle. The hydraulic pressure control circuit 1 includes a plurality of flow paths and a plurality of hydraulic pressure control valves, regulates a pressure of the oil supplied from the mechanical oil pump MP and the electric oil pump EP, and supplies the oil to each part of the transmission TM.

The vehicle further includes various sensors 27. The various sensors 27 include an acceleration sensor 271 as an acceleration detection means that detects an acceleration or deceleration of the vehicle, an engine rotation speed sensor 272 as an engine rotation speed detection means that detects an engine rotation speed, and an oil temperature sensor 273 as an oil temperature detection means that detects an oil temperature.

The controller 2 is a controller for controlling the transmission TM, and controls the hydraulic pressure control circuit 1 and the electric motor M that drives the electric oil pump EP based on signals output from the various sensors 27 and the like. In the present embodiment, the controller 2 is implemented by a CPU as a computer, but is not limited thereto, and may be implemented by a plurality of microcomputers, for example. Details of the controller 2 will be described later.

The hydraulic pressure control circuit 1 controls the hydraulic pressures of the lock-up clutch LU, the forward clutch FWD/C, the reverse brake REV/B, the primary pulley PRI, the secondary pulley SEC, and the like based on commands from the controller 2.

(Configuration of Controller)

Next, the controller 2 will be described with reference to FIG. 2.

Figure 2:
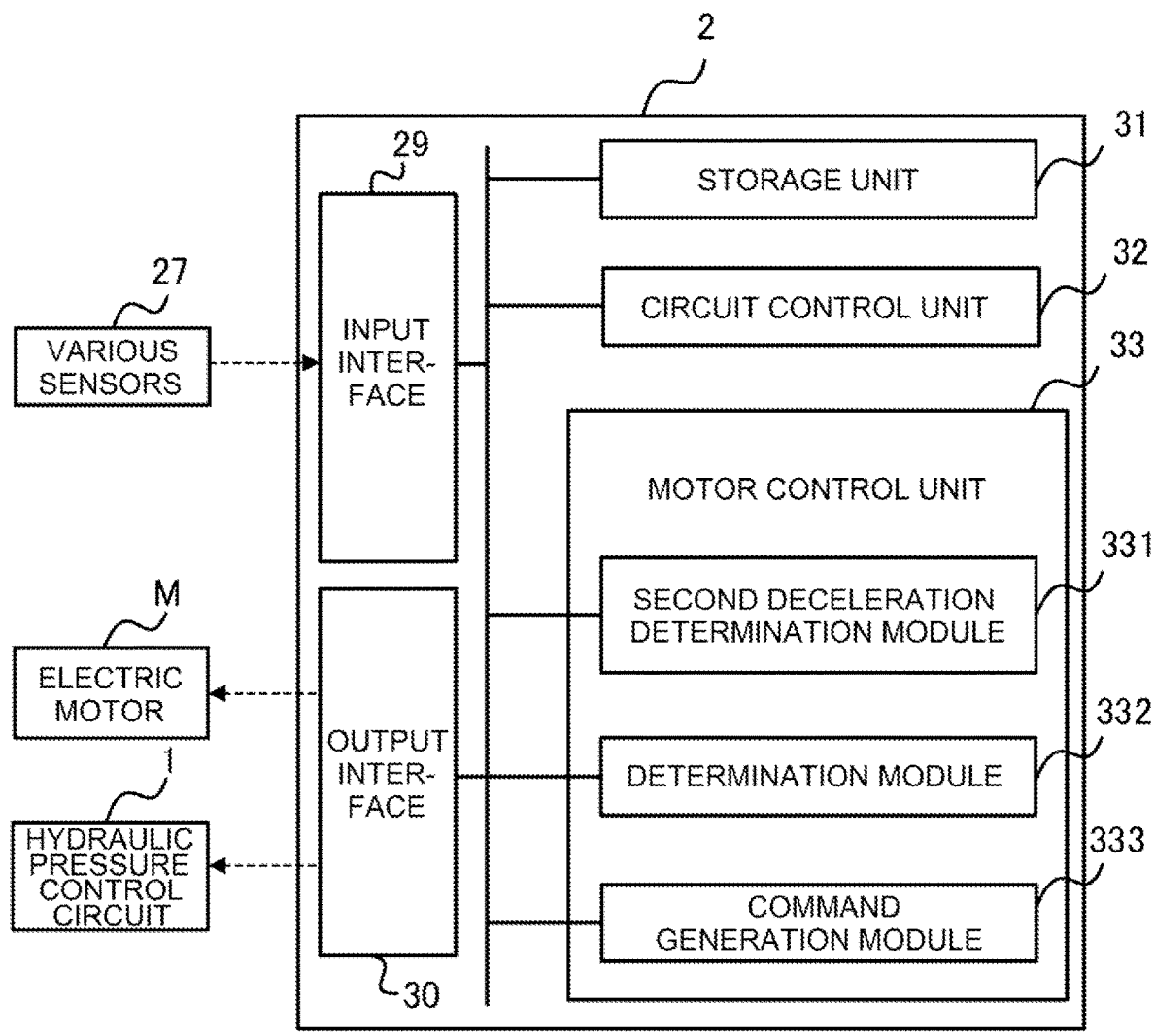
FIG. 2 is a configuration block diagram showing a controller and main components connected to the controller.

FIG. 2 is a configuration block diagram showing the controller 2 and main components connected to the controller 2.

As shown in FIG. 2, the controller 2 includes an input interface 29, an output interface 30, a storage unit 31, a hydraulic pressure control circuit control unit 32 (hereinafter, simply referred to as a circuit control unit 32), and an electric motor control unit 33 (hereinafter, simply referred to as a motor control unit 33) that are electrically connected to one another.

Output signals from the various sensors 27 that detect various parameters are input to the input interface 29.

A circuit control command generated by the processing of the circuit control unit 32 and a motor control command generated by the processing of the motor control unit 33 are output to the hydraulic pressure control circuit 1 and the electric motor M via the output interface 30, respectively.

The storage unit 31 is a memory for temporarily storing the various parameters included in the output signals from the various sensors 27. The storage unit 31 stores processing programs and algorithm programs executed by the circuit control unit 32 and the motor control unit 33. In the present embodiment, the storage unit 31 is built in the controller 2, but is not limited thereto, and may be provided separately from the controller 2, for example.

The storage unit 31 stores a prescribed functional equation f(T) for obtaining a prescribed rotation speed, a first deceleration D1, a first oil temperature T1, a second oil temperature T2 as a prescribed oil temperature, and a second deceleration D2 as a prescribed deceleration, which are used in an operation necessity determination process of the electric oil pump EP. The prescribed functional equation f(T) for obtaining the first deceleration D1, the first oil temperature T1, the second oil temperature T2, and the second deceleration D2 will be described later.

The circuit control unit 32 generates a circuit control command based on the output signals output from the various sensors 27, and outputs the generated circuit control command to the hydraulic pressure control circuit 1 via the output interface 30.

The motor control unit 33 generates a motor control command based on the output signals output from the various sensors 27, and outputs the generated motor control command to the electric motor M via the output interface 30.

In addition, the motor control unit 33 includes a second deceleration determination module 331 as a second deceleration determination means, a determination module 332 as a determination means, and a command generation module 333 as a command generation means. Details of the second deceleration determination module 331, the determination module 332, and the command generation module 333 will be described later in the operation necessity determination process of the electric oil pump EP.

(Description of Operation Region and Non-Operation Region of Electric Oil Pump)

Next, an operation region and a non-operation region of the electric oil pump EP will be described with reference to FIG. 3.

Figure 3:
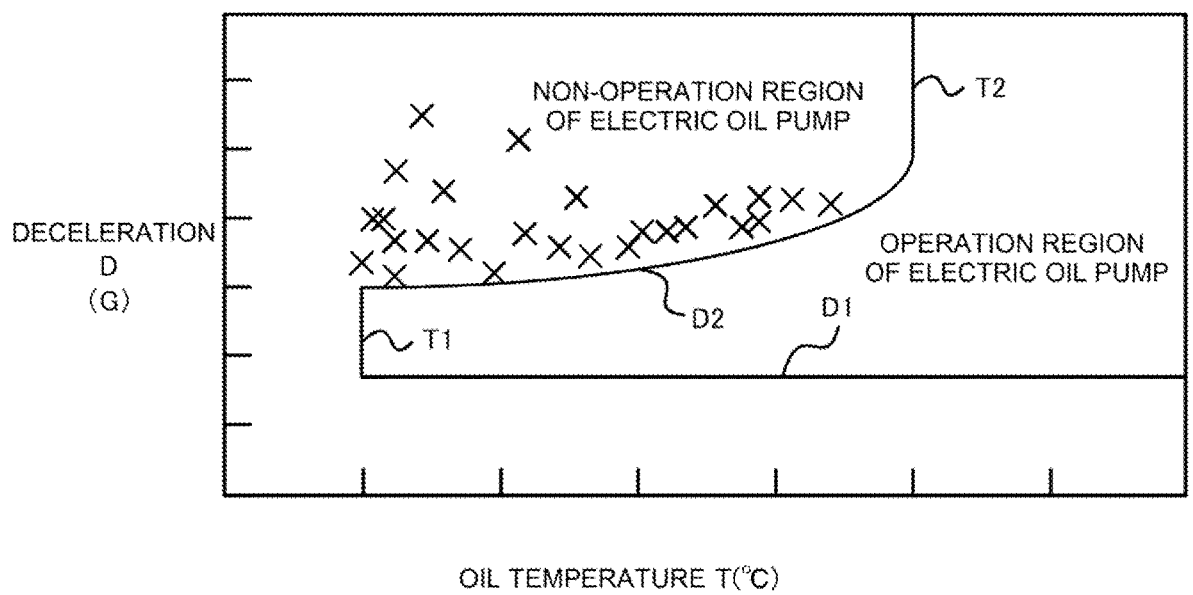
FIG. 3 is a diagram showing an operation region of an electric oil pump and a non-operation region of the electric oil pump in a table including an oil temperature and a deceleration.

FIG. 3 is a diagram showing the operation region of the electric oil pump EP and the non-operation region of the electric oil pump EP in a table including an oil temperature T and a deceleration D. In FIG. 3, horizontal and vertical axes represent the oil temperature T of the vehicle and the deceleration D of the vehicle, respectively. In FIG. 3, "x" indicates that air suction occurs in the experiment.

As shown in FIG. 3, when the deceleration (specifically, a maximum deceleration) D of the vehicle is lower than the first deceleration D1, the electric oil pump EP does not suction air, but a required amount of oil can be secured with the oil supplied from the mechanical oil pump MP. Therefore, a region in which the deceleration D of the vehicle is lower than the first deceleration D1 is defined as the non-operation region of the electric oil pump EP. The first deceleration D1 is an invariable value that does not change depending on the oil temperature T of the vehicle. In the present embodiment, the first deceleration D1 is an invariable value, but the first deceleration D1 may also be changed.

When the oil temperature T of the vehicle is lower than the first oil temperature T1, the required amount of oil can be secured with the oil supplied from the mechanical oil pump MP. Therefore, a region in which the oil temperature T of the vehicle is lower than the first oil temperature T1 is defined as the non-operation region of the electric oil pump EP. The first oil temperature T1 is an invariable value that does not change depending on the deceleration D. In the present embodiment, the first oil temperature T1 is an invariable value, but the first oil temperature T1 may also be changed.

When the deceleration of the vehicle is greater than or equal to the first deceleration D1 and the oil temperature T of the vehicle is greater than or equal to the second oil temperature T2 which is greater than the first oil temperature T1, the electric oil pump EP does not suction air even when the deceleration D of the vehicle is large. Therefore, a region in which the deceleration of the vehicle is greater than or equal to the first deceleration D1 and the oil temperature T of the vehicle is greater than or equal to the second oil temperature T2 is defined as the operation region of the electric oil pump EP. The second oil temperature T2 is an invariable value that does not change depending on the deceleration D. In the present embodiment, the second oil temperature T2 is an invariable value, but the second oil temperature T2 may also be changed.

When the oil temperature T of the vehicle is between the first oil temperature T1 and the second oil temperature T2 and the deceleration D of the vehicle exceeds the second deceleration D2 which is a prescribed deceleration greater than the first deceleration D1, the electric oil pump EP suctions air. Therefore, a region in which the oil temperature T of the vehicle is between the first oil temperature T1 and the second oil temperature T2 and the deceleration of the vehicle exceeds the second deceleration D2 is defined as the non-operation region of the electric oil pump EP.

The second deceleration D2 is a variable value that varies depending on the oil temperature T of the vehicle. Accordingly, the operation region of the electric oil pump EP can be enlarged as compared with a case where the second deceleration D2 is an invariable value that does not change depending on the oil temperature T of the vehicle.

Specifically, as shown in FIG. 3, the higher the oil temperature T of the vehicle, the harder it is for the electric oil pump EP to suction air even when the deceleration D of the vehicle is large, and therefore, the second deceleration D2 is determined to increase as the oil temperature T of the vehicle increases. Accordingly, when the oil temperature T of the vehicle is high, it becomes easier to drive the electric oil pump EP, and it is possible to prevent the amount of oil from decreasing even when a vehicle speed decreases, so that the vehicle can shift gears smoothly. As a result, since a reduction ratio required for starting the vehicle can be obtained when the vehicle is stopped, an acceleration when starting the vehicle can be obtained. More specifically, the second deceleration D2 is obtained (determined) based on the oil temperature T of the vehicle and the prescribed functional equation f(T) set in advance. In the present embodiment, the second deceleration D2 varies to increase as the oil temperature T of the vehicle increases.

On the other hand, when the oil temperature T of the vehicle is between the first oil temperature T1 and the second oil temperature T2 and the deceleration D of the vehicle is between the first deceleration D1 and the second deceleration D2, the electric oil pump EP does not suction air. Therefore, a region in which the oil temperature T of the vehicle is between the first oil temperature T1 and the second oil temperature T2 and the deceleration D of the vehicle is between the first deceleration D1 and the second deceleration D2 is defined as the operation region of the electric oil pump EP.

(Operation Necessity Determination Process of Electric Oil Pump)

Next, the operation necessity determination process of the electric oil pump EP will be described with reference to FIG. 4.

Figure 4:
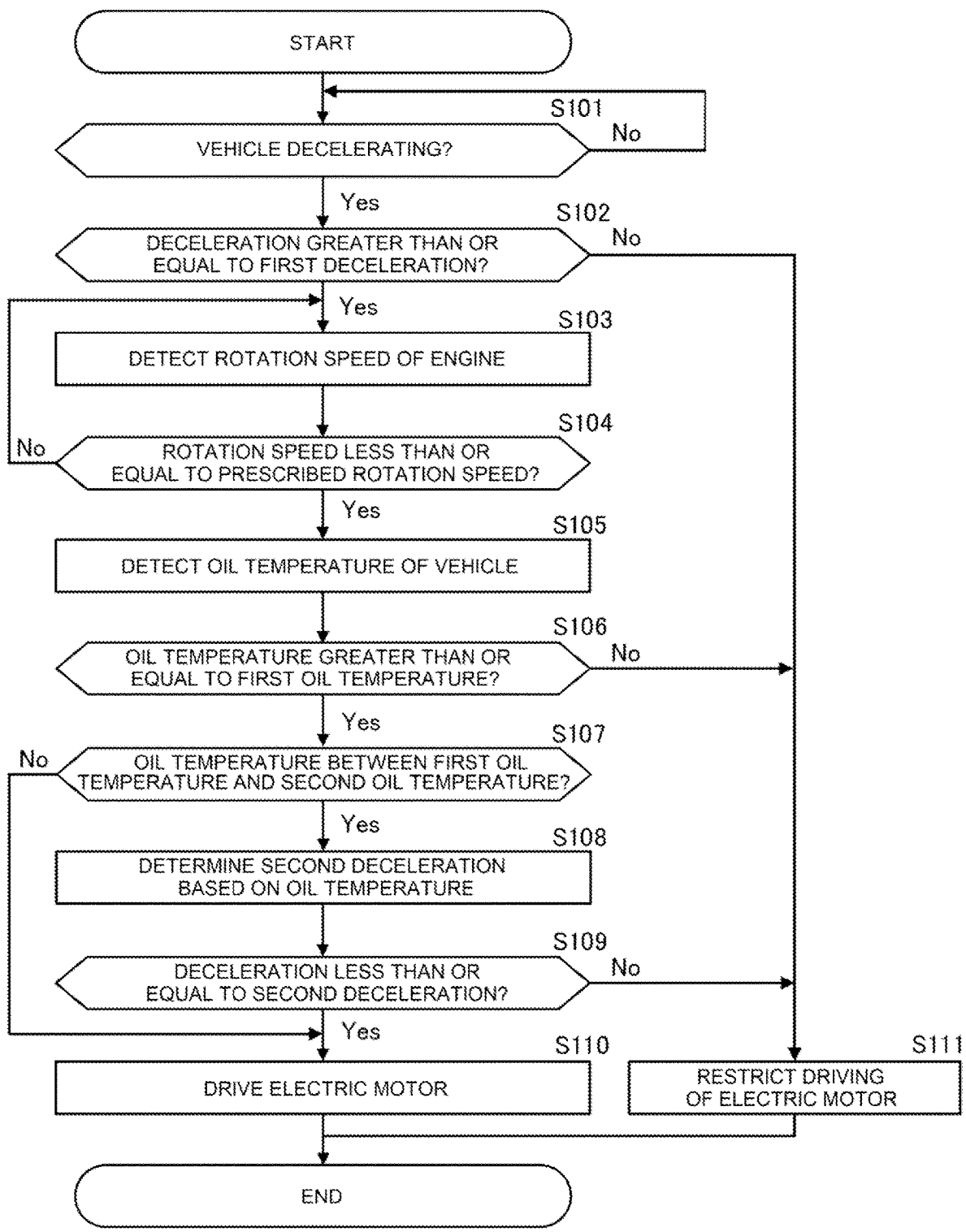
FIG. 4 is a flowchart showing an operation necessity determination process of the electric oil pump.

FIG. 4 is a flowchart showing the operation necessity determination process of the electric oil pump EP.

As shown in FIG. 4, first, in step S101, the determination module 332 of the motor control unit 33 determines whether the vehicle is decelerating based on a signal output from the acceleration sensor 271. If the vehicle is decelerating (in the case of Yes), the process proceeds to step S102. On the other hand, if the vehicle is not decelerating (in the case of No), step S101 is repeated.

Next, in step S102, the determination module 332 determines whether the deceleration D of the vehicle detected by the acceleration sensor 271 is greater than or equal to the first deceleration D1. If the deceleration D of the vehicle is greater than or equal to the first deceleration D1 (in the case of Yes), the process proceeds to step S103. On the other hand, if the deceleration D of the vehicle is lower than the first deceleration D1 (in the case of No), the process proceeds to step S111.

Next, in step S103, the engine rotation speed sensor 272 detects a rotation speed of the engine ENG, outputs the detected rotation speed of the engine ENG to the motor control unit 33 via the input interface 29, and proceeds to step S104.

Next, in step S104, the determination module 332 determines whether the rotation speed of the engine ENG detected by the engine rotation speed sensor 272 is less than or equal to a prescribed rotation speed. If the rotation speed of the engine ENG is less than or equal to the prescribed rotation speed (in the case of Yes), the process proceeds to step S105. On the other hand, if the rotation speed of the engine ENG exceeds the prescribed rotation speed (in the case of No), the process returns to step S103.

Next, in step S105, the oil temperature sensor 273 detects the oil temperature T of the vehicle, outputs the detected oil temperature T of the vehicle to the motor control unit 33 via the input interface 29, and proceeds to step S106.

Next, in step S106, the determination module 332 determines whether the oil temperature T of the vehicle detected by the oil temperature sensor 273 is greater than or equal to the first oil temperature T1. If the oil temperature T of the vehicle is greater than or equal to the first oil temperature T1 (in the case of Yes), the process proceeds to step S107. On the other hand, if the oil temperature T of the vehicle is lower than the first oil temperature T1 (in the case of No), the process proceeds to step S111.

Next, in step S107, the determination module 332 determines whether the oil temperature T of the vehicle detected by the oil temperature sensor 273 is between the first oil temperature T1 and the second oil temperature T2. If the oil temperature T of the vehicle is between the first oil temperature T1 and the second oil temperature T2 (in the case of Yes), the process proceeds to step S108. On the other hand, if the oil temperature T of the vehicle exceeds the second oil temperature T2 (in the case of No), the process proceeds to step S110.

Next, in step S108, the second deceleration determination module 331 obtains the second deceleration D2 based on the oil temperature T of the vehicle detected by the oil temperature sensor 273, and proceeds to step S109. Specifically, in step S108, the second deceleration determination module 331 obtains the second deceleration D2 based on the oil temperature T of the vehicle and the prescribed functional equation f(T) stored in the storage unit 31 in advance. Then, the second deceleration determination module 331 outputs the obtained second deceleration D2 to the determination module 332.

Next, in step S109, the determination module 332 of the motor control unit 33 determines whether the deceleration D of the vehicle is less than or equal to the second deceleration D2. If the deceleration D of the vehicle is less than or equal to the second deceleration D2 (in the case of Yes), the process proceeds to step S110. On the other hand, if the deceleration D of the vehicle exceeds the second deceleration D2 (in the case of No), the process proceeds to step S111.

Next, in step S110, the motor control unit 33 drives the electric motor M to supply a hydraulic pressure from the electric oil pump EP to the transmission TM. Specifically, in step S110, the command generation module 333 of the motor control unit 33 generates an oil supply command based on the determination of No in step S107 or the determination of Yes in step S109. The command generation module 333 outputs the generated oil supply command to the electric motor M via the output interface 30. The electric motor M is driven based on the oil supply command output from the command generation module 333, and operates the electric oil pump EP to supply the hydraulic pressure from the electric oil pump EP to the transmission TM. Then, this process is ended.

In the case of No in step S107, that is, in the case where the deceleration D of the vehicle is greater than or equal to the first deceleration D1 and the oil temperature T of the vehicle exceeds the second oil temperature T2, even when the motor control unit 33 drives the electric motor M to supply the hydraulic pressure from the electric oil pump EP to the transmission TM, the electric oil pump EP does not suction air. Therefore, the air suction by the electric oil pump EP does not affect the transmission TM. Accordingly, since the driving of the electric oil pump EP is not restricted even when the deceleration D of the vehicle is large, it is possible to prevent a decrease in the amount of oil even when the vehicle speed decreases in a state in which the deceleration D of the vehicle is large, and the vehicle can shift gears smoothly. As a result, since the reduction ratio required for starting the vehicle can be obtained when the vehicle is stopped, the acceleration when starting the vehicle can be obtained.

In the case of Yes in step S109, that is, in the case where the oil temperature T of the vehicle is between the first oil temperature T1 and the second oil temperature T2 and the deceleration D of the vehicle is between the first deceleration D1 and the second deceleration D2, even when the motor control unit 33 drives the electric motor M to supply the hydraulic pressure from the electric oil pump EP to the transmission TM, the electric oil pump EP does not suction air. Therefore, the air suction by the electric oil pump EP does not affect the transmission TM.

On the other hand, in step S111, the motor control unit 33 restricts the driving of the electric motor M not to supply the hydraulic pressure from the electric oil pump EP to the transmission TM. Specifically, in step S111, the command generation module 333 generates an oil non-supply command based on the determination of No in step S104, the determination of No in step S106, or the determination of No in S109. The command generation module 333 outputs the generated oil non-supply command to the electric motor M via the output interface 30. The driving of the electric motor M is restricted based on the oil non-supply command output from the command generation module 333, the electric oil pump EP is not operated, and therefore, no hydraulic pressure is supplied from the electric oil pump EP to the transmission TM. In this case, the engine ENG is controlled such that a rotation speed thereof increases. Then, this process is ended.

In the case of No in step S104, that is, in the case where the deceleration D of the vehicle is lower than the first deceleration D1, since the driving of the electric motor M is restricted not to supply the hydraulic pressure from the electric oil pump EP to the transmission TM, it is possible to prevent the durability of the electric oil pump EP from decreasing due to the electric oil pump EP being used too frequently.

In the case of No in step S106, that is, in the case where the oil temperature T of the vehicle is lower than the first oil temperature T1, the driving of the electric motor M is restricted not to supply the hydraulic pressure from the electric oil pump EP to the transmission TM. Therefore, it is possible to prevent the durability of the electric oil pump EP from decreasing due to the electric oil pump EP being used too frequently.

In the case of No in step S109, that is, in the case where the oil temperature T of the vehicle is between the first oil temperature T1 and the second oil temperature T2 and the deceleration D of the vehicle exceeds the second deceleration D2, when the electric oil pump EP is operated by driving the electric motor M, the electric oil pump EP suctions air. Therefore, the driving of the electric motor M is restricted not to supply the hydraulic pressure from the electric oil pump EP to the transmission TM. Accordingly, the influence on the transmission TM due to air suction by the electric oil pump EP can be reduced. Then, in response to a subsequent acceleration request, a higher driving force can be transmitted than when the electric oil pump EP is operated, so that the sense of discomfort given to the driver can be reduced.

(Operation and Effect)

Next, a main operation and effect of the present embodiment will be described.

(1) The controller 2 (control device) for a vehicle according to the present embodiment is the controller 2 (control device) for a vehicle, the vehicle including the transmission TM including the mechanical oil pump MP (first oil pump) driven by the engine ENG (first drive source) and the electric oil pump EP (second oil pump) driven by the electric motor M (second drive source), the engine ENG being configured to drive the drive wheels DW, in which when a rotation speed of the engine ENG (first drive source) is less than or equal to a prescribed rotation speed as the vehicle decelerates, driving of the electric motor M (second drive source) is controlled to supply a hydraulic pressure from the electric oil pump EP (second oil pump) to the transmission TM, and when the deceleration D of the vehicle exceeds the second deceleration D2 (prescribed deceleration), the driving of the electric motor M (second drive source) is restricted not to supply the hydraulic pressure from the electric oil pump EP (second oil pump) to the transmission TM.

(5) A control method for a vehicle according to the present embodiment is a control method for a vehicle, the vehicle including the transmission TM including the mechanical oil pump MP (first oil pump) driven by the engine ENG (first drive source) and the electric oil pump EP (second oil pump) driven by the electric motor M (second drive source), the engine ENG being configured to drive the drive wheels DW, the control method including: controlling driving of the electric motor M (second drive source) to supply a hydraulic pressure from the electric oil pump EP (second oil pump) to the transmission TM when a rotation speed of the engine ENG (first drive source) is less than or equal to a prescribed rotation speed as the vehicle decelerates; and restricting the driving of the electric motor M (second drive source) not to supply the hydraulic pressure from the electric oil pump EP (second oil pump) to the transmission TM when the deceleration D of the vehicle exceeds the second deceleration D2 (prescribed deceleration).

(6) A program according to the present embodiment is a program executable by a computer for controlling a vehicle, the vehicle including the transmission TM including the mechanical oil pump MP (first oil pump) driven by the engine ENG (first drive source) and the electric oil pump EP (second oil pump) driven by the electric motor M (second drive source), the engine ENG being configured to drive the drive wheels DW, the program causing the computer to execute: a step of controlling driving of the electric motor M (second drive source) to supply a hydraulic pressure from the electric oil pump EP (second oil pump) to the transmission TM when a rotation speed of the engine ENG (first drive source) is less than or equal to a prescribed rotation speed as the vehicle decelerates; and a step of restricting the driving of the electric motor M (second drive source) not to supply the hydraulic pressure from the electric oil pump EP (second oil pump) to the transmission TM when the deceleration D of the vehicle exceeds the second deceleration D2 (prescribed deceleration).

According to these configurations, in a case where the deceleration D of the vehicle exceeds the second deceleration D2, since the electric oil pump EP suctions air when the electric oil pump EP is operated by driving the electric motor M, the driving of the electric motor M is restricted not to supply the hydraulic pressure from the electric oil pump EP to the transmission TM. Accordingly, the influence on the transmission TM due to air suction by the electric oil pump EP can be reduced. Then, in response to a subsequent acceleration request, a higher driving force can be transmitted than when the electric oil pump EP is operated, so that the sense of discomfort given to the driver can be reduced.

(2) The second deceleration D2 (prescribed deceleration) changes depending on the oil temperature T.

According to this configuration, an operation region of the electric oil pump EP can be enlarged as compared with a case where the second deceleration D2 is an invariable value that does not change depending on the oil temperature T of the vehicle.

(3) The second deceleration D2 (prescribed deceleration) increases as the oil temperature T increases.

According to this configuration, the higher the oil temperature T of the vehicle, the harder it is for the electric oil pump EP to suction air even when the deceleration D of the vehicle is large, and therefore, the second deceleration D2 is determined to increase as the oil temperature T increases. Accordingly, when the oil temperature T of the vehicle is high, it becomes easier to drive the electric oil pump EP, and it is possible to prevent the amount of oil from decreasing even when a vehicle speed decreases, so that the vehicle can shift gears smoothly. As a result, since a reduction ratio required for starting the vehicle can be obtained when the vehicle is stopped, an acceleration when starting the vehicle can be obtained.

(4) When the oil temperature T is greater than or equal to the second oil temperature T2 (prescribed oil temperature), the controller 2 (control device) controls the driving of the electric motor M (second drive source) to supply the hydraulic pressure from the electric oil pump EP (second oil pump) to the transmission TM.

According to this configuration, in the case where the oil temperature T of the vehicle exceeds the second oil temperature T2, even when the motor control unit 33 drives the electric motor M to supply the hydraulic pressure from the electric oil pump EP to the transmission TM, the electric oil pump EP does not suction air, and thus the air suction by the electric oil pump EP does not affect the transmission TM. Therefore, since the driving of the electric oil pump EP is not restricted even when the deceleration D of the vehicle is large, it is possible to prevent a decrease in the amount of oil even when the vehicle speed decreases in a state in which the deceleration D of the vehicle is large, and the vehicle can shift gears smoothly. As a result, since the reduction ratio required for starting the vehicle can be obtained when the vehicle is stopped, the acceleration when starting the vehicle can be obtained.

(Modification) In the above embodiment, the first oil pump and the second oil pump are respectively implemented by the mechanical oil pump MP and the electric oil pump EP, but the first oil pump and the second oil pump are not limited thereto, and may be implemented by two electric oil pumps EP, for example.

Although the embodiment of the present invention has been described above, the above embodiment is merely a part of application examples of the present invention, and is not intended to limit the technical scope of the present invention to the specific configurations of the above embodiment.

The present application claims a priority of Japanese Patent Application No. 2021-110773 filed with the Japan Patent Office on Jul. 2, 2021, all the contents of which are hereby incorporated by reference.

DESCRIPTION OF REFERENCE SIGNS 2 controller (control device)
D deceleration
D2 second deceleration (prescribed deceleration)
M electric motor (second drive source)
T oil temperature
T2 second oil temperature (prescribed oil temperature)

EP mechanical oil pump (first oil pump)
MP electric oil pump (second oil pump)
TM transmission (belt continuously variable transmission)
ENG engine (first drive source)

The invention claimed is:

1. A control device for a vehicle, the vehicle including a transmission including a first oil pump driven by a first drive source and a second oil pump driven by a second drive source, the first drive source being configured to drive a drive wheel, wherein
    the second drive source is configured to drive the second oil pump while the vehicle is running,
    when a rotation speed of the first drive source is less than or equal to a prescribed rotation speed as the vehicle decelerates, driving of the second drive source is controlled to supply a hydraulic pressure from the second oil pump to the transmission, and
    when the vehicle is decelerating and a deceleration of the vehicle exceeds a prescribed deceleration, the driving of the second drive source is restricted not to supply the hydraulic pressure from the second oil pump to the transmission.

2. The control device for the vehicle according to claim 1, wherein
    the prescribed deceleration changes depending on an oil temperature.

3. The control device for the vehicle according to claim 2, wherein
    the prescribed deceleration increases as the oil temperature increases.

4. The control device for the vehicle according to claim 3, wherein
    when the oil temperature is greater than or equal to a prescribed oil temperature, the driving of the second drive source is controlled to supply the hydraulic pressure from the second oil pump to the transmission.

5. A control method for a vehicle, the vehicle including a transmission including a first oil pump driven by a first drive source and a second oil pump driven by a second drive source, the first drive source being configured to drive a drive wheel and the second drive source being configured to drive the second oil pump while the vehicle is running, the control method comprising:
    controlling driving of the second drive source to supply a hydraulic pressure from the second oil pump to the transmission when a rotation speed of the first drive source is less than or equal to a prescribed rotation speed as the vehicle decelerates; and
    restricting the driving of the second drive source not to supply the hydraulic pressure from the second oil pump to the transmission when the vehicle is running and a deceleration of the vehicle exceeds a prescribed deceleration.

6. A non-transitory computer-readable medium storing a program executable by a computer for controlling a vehicle, the vehicle including a transmission including a first oil pump driven by a first drive source and a second oil pump driven by a second drive source, the first drive source being configured to drive a drive wheel and the second drive source being configured to drive the second oil pump while the vehicle is running, the program causing the computer to execute:
    a procedure of controlling driving of the second drive source to supply a hydraulic pressure from the second oil pump to the transmission when a rotation speed of the first drive source is less than or equal to a prescribed rotation speed as the vehicle decelerates; and
    a procedure of restricting the driving of the second drive source not to supply the hydraulic pressure from the second oil pump to the transmission when the vehicle is running and a deceleration of the vehicle exceeds a prescribed deceleration.

* * * * *